United States Patent [19]
Nishida

[11] Patent Number: 4,616,168
[45] Date of Patent: Oct. 7, 1986

[54] BATTERY SERVICE SYSTEM FOR SMALL-SIZED MARINE CRAFT

[75] Inventor: Hiroshi Nishida, Miki, Japan

[73] Assignee: Kawasaki Jukogyo Kabushiki Kaisha, Kobe, Japan

[21] Appl. No.: 765,511

[22] Filed: Aug. 14, 1985

[30] Foreign Application Priority Data

Aug. 16, 1984 [JP] Japan ............................ 59-124838[U]

[51] Int. Cl.⁴ .......................... H02J 7/00; B63B 35/00
[52] U.S. Cl. ......................................... 320/2; 114/270
[58] Field of Search .................... 320/2; 114/230, 270; 440/6, 7

[56] References Cited

U.S. PATENT DOCUMENTS

| | | | |
|---|---|---|---|
| 2,645,792 | 7/1953 | Waters | 440/6 |
| 3,405,677 | 10/1968 | Smith | 114/270 |
| 3,604,381 | 9/1971 | Neidenberg | 114/270 |
| 3,769,926 | 11/1973 | Race | 114/270 |
| 3,929,606 | 12/1975 | Wood | 114/270 X |

*Primary Examiner*—R. J. Hickey
*Attorney, Agent, or Firm*—Leydig, Voit & Mayer, Ltd.

[57] ABSTRACT

A battery service system for a small-sized marine craft having service terminals provided on a portion of the deck of the marine craft above the water line so as to project from the deck surface. Electric wiring which connects an inboard battery to the engine of the marine craft is made through the service terminals.

3 Claims, 4 Drawing Figures

BATTERY SERVICE SYSTEM FOR SMALL-SIZED MARINE CRAFT

BACKGROUND OF THE INVENTION

1. Field of the Invention:

The present invention broadly relates to a small-sized marine craft for use in marine sports or for leisure purposes, which is suited to running about the sea area near the shore under the control of a rider on a deck portion who grips a steering handle bar standing up from the bow portion. More particularly, the invention is concerned with battery service system for a marine craft of the type mentioned above.

2. Description of the Related Art:

In general, a small-sized marine craft of the kind described has an engine mounted in an engine room formed in the bow portion of the shell and a propulsion means provided at the stern portion of the same. The rider stands up or sits on a deck portion formed on the shell to the rear of the engine room and grips the steering handle bar on the bow portion of the shell.

The shell has a breadth which is substantially equal to or slightly greater than the shoulder breadth of a rider.

The propulsion means may be a propeller or a pumped water jet. Where a pumped water jet is used, the marine craft can be steered by changing the direction of the jet.

The power supply such as for engine starter is made by an inboard battery which is adapted to be charged up by a dynamo connected to the engine.

In the known small-sized marine craft of the type explained above, the battery is mounted in the engine room and the wiring to the engine is made directly through the space in the engine room. With this arrangement, therefore, it is necessary to open the engine hood in order to make the battery accessible for the purpose of, for example, external battery service, i.e., for the connection to external power supply through a shore connection.

This work is rather laborious and suffers from various problems.

Namely, when the battery has become flat, it is necessary to connect the battery to a charger or a suitable electric power supply on the shore through a shore connection. This requires troublesome work for opening the engine hood. In addition, since such work is usually carried out at the beach, there is a risk that water accidentally comes into the engine room.

In the practical use of small-sized marine craft of the kind described, it is quite a usual thing to start and stop the engine frequently, which often causes the battery to become flat. In such a case, it is necessary to charge up the battery or to start the engine by means of the battery of another marine craft, even when the marine craft is floating offshore. The risk of flooding of the engine room exists also in this case because the charging of the battery or starting of the engine by the power of battery of another marine craft requires the engine hood to be opened.

SUMMARY OF THE INVENTION

Accordingly, an object of the invention is to provide a battery service system for a small-sized marine craft which permits an easy battery service such as charging up of the inboard battery without any risk of flooding of the engine room not only at the beach but also when the marine craft is floating offshore.

To this end, according to the invention, there is provided a battery service system for a small-sized marine craft comprising service terminals provided on a portion of the deck of the marine craft above the water line such as to project from the deck surface, and electric wiring which connects an inboard battery to the engine of the marine craft through the service terminals.

With this arrangement, it is possible to swiftly conduct the necessary battery service by a shore power supply or by the battery of another marine craft, without requiring the engine hood to be opened.

The above and other objects, features and advantages of the invention will become clear from the following description of the preferred embodiment when the same is read in conjunction with the accompanying drawings.

DESCRIPTION OF THE PREFERRED EMBODIMENTS

Figure 1:
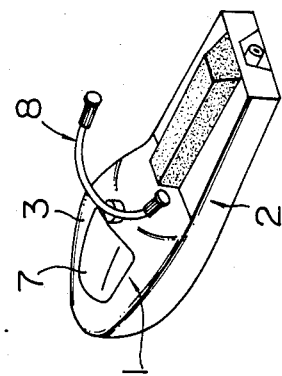
FIG. 1 is a perspective view of a small-sized marine craft equipped with a battery service system in accordance with the invention.
Figure 2:
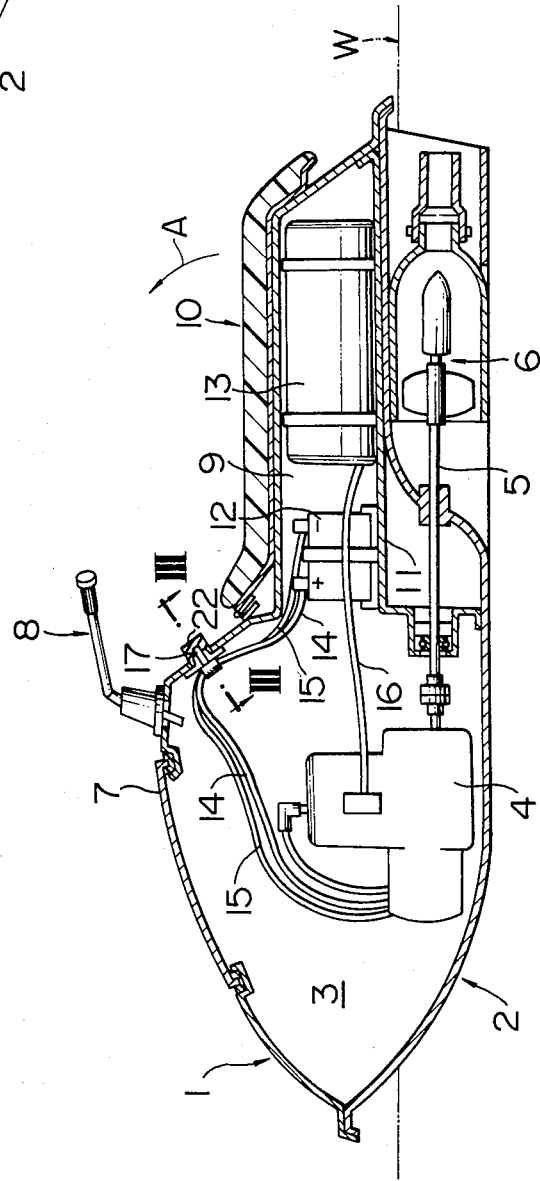
FIG. 2 is a longitudinal sectional view of the small-sized marine craft shown in FIG. 1 taken along the central axis thereof.

Referring to FIGS. 1 and 2, a small-sized marine craft to which the invention is applied has a deck 1 and a hull 2 which are connected to each other such as to form a hollow shell. The shell has an engine room 3 formed on a bow portion thereof and accommodating an engine 4 which drives, through a drive shaft 5, a propeller 6 on the stern portion of the hull. The shell is opened at the upper side of the engine room 3, and this opening is hermetically covered by an engine hood 7 through a seal placed therebetween. The engine hood 7 is adapted to be removed as required to make the engine accessible for the purpose of repair or maintenance. The rear deck behind the engine room provides an area for a rider and, if any, a fellow rider. The rider holds on a steering handle bar 8 standing up from the bow portion of the shell so as to steer the marine craft while stably supporting himself.

The rear deck portion is protruded upwardly at its central portion such as to form a protrusion 9 which in turn is covered by a seat member 10 placed thereon.

The space inside the protrusion 9 accommodates a battery 12 and a fuel tank 13 which are situated on a suitable pedestal 11 having the form of a plate or a box.

The battery 12 has a positive terminal (+) to which is connected an electric cord (positive cord) leading to a starter solenoid of the engine 4, and a negative (−) terminal to which is connected an electric cord (negative cord) 15 which is grounded through the engine.

A fuel pipe 16 having a fuel pump and other necessary parts is connected between the fuel tank 13 and a carburetor attached to the engine 4.

Figure 3:
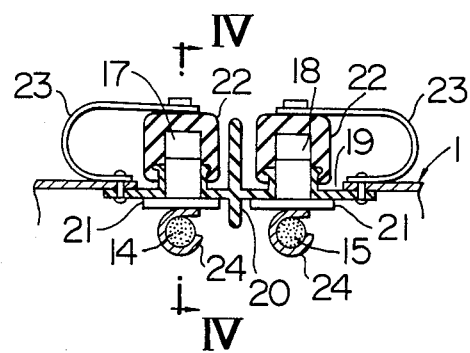
FIG. 3 is an enlarged sectional view taken along the line III—III of FIG. 2.

Service terminals 17 and 18 are provided on a portion of the deck 1 above the water line W, e.g., on a rear upper portion of the engine room 3 as shown in FIGS. 2 and 3, such as to project from the surface of the deck 1. The electric cords 14 and 15 mentioned before are laid through these service terminals 17 and 18.

Figure 4:
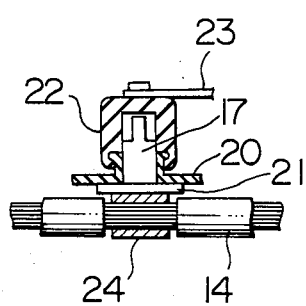
FIG. 4 is a sectional view taken along the line IV—IV of FIG. 3.

FIGS. 3 and 4 illustrate the manner in which the service terminals 17 and 18 are attached to the hull. As will be seen from these figures, the service terminals 17 and 18 are mounted leaving a suitable space therebetween on an insulator 20 constituted by, for example, a bakelite plate. More specifically, the service terminals are received in respective holes in the insulator plate 20 from the back side thereof and are fastened to the insulator plate 20 substantially hermetically with their flanges held in abutment with the back surface of the insulator plate.

Core wires (conductors) of the positive and negative cords 14 and 15 are connected to the inner ends of the respective service terminals 17, 18, e.g., to the flanges 21 as in the illustrated case, by means of connectors 24. Usually, soldering or other melting connection measure is adopted for connecting the core wires through the connectors 24.

As will be understood from the drawings, the outer ends of the service terminals revealed on the deck are covered by rubber caps (water-proof caps) 22 which may be connected to the deck 1 or the insulator plate 20 through suitable strings so as not to be lost.

According to the invention, when it is necessary to charge up the inboard battery which has become flat or to start the engine by the power of battery on another marine craft, the required battery service can be conducted without difficulty simply by removing the water-proof caps 22, 22 and connecting the external power lines to the exposed service terminals 17 and 18.

Since the service terminals are provided far above the water line W and since the external power lines can be connected to the service terminals without requiring opening of the engine hood, the risk of flooding of the engine room is avoided and the work can be done quite easily and promptly, not only when the marine craft is at the beach but also when the same is afloat offshore.

The service terminals 17 and 18 provided far above the water line W also facilitates the supply of power to another marine craft of a similar type when the battery of such marine craft has become flat, simply by connecting the service terminals 17, 18 of both marine crafts by booster cables.

Although in the illustrated embodiment the battery 12 is placed under the seat 10, this is not exclusive and the battery may be situated in the engine room 3 or other suitable place, without impairing the advantages of the invention.

It is to be understood also that the illustrated positions of the service terminals 17, 18 are only illustrative, and the service terminals may be located at any suitable positions above the water line W.

Although the invention has been described through specific terms, it is to be noted here that the described embodiment is only illustrative and various changes and modifications may be imparted thereto without departing from the scope of the invention which is limited solely by the appended claims.

What is claimed is:

1. A battery service system for a small-sized marine craft having a deck and engine comprising service terminals provided on a portion of the deck of said marine craft above the water line so as to project from the deck surface, and electric wiring which connects an inboard battery to the engine of said marine craft through said service terminals.

2. A battery service system according to claim 1, wherein portions of said service terminals projecting from said deck are covered by detachable water-proof caps.

3. A battery service system according to claim 2, wherein said caps are connected to said deck through a connecting means.

* * * * *